US010831610B2

(12) United States Patent
Singhal et al.

(10) Patent No.: US 10,831,610 B2
(45) Date of Patent: Nov. 10, 2020

(54) SYSTEM AND METHOD FOR ADAPTIVE BACKUP WORKFLOWS IN DYNAMIC PRIORITY ENVIRONMENT

(71) Applicant: EMC IP Holding Company LLC, Hopkinton, MA (US)

(72) Inventors: Upanshu Singhal, Bangalore (IN); Shivakumar Kunnal Onkarappa, Bangalore (IN); Chakraveer Singh, Bangalore (IN); Archit Seth, Bangalore (IN); Shilpa Mehta, Bangalore (IN); Rahul Bhardwaj, Udaipur (IN); Akansha Purwar, Bangalore (IN); Lalita Dabburi, Bangalore (IN); Chandra Prakash, Bangalore (IN); Kumari Priyanka, Bengaluru (IN); Manish Sharma, Bangalore (IN); Shelesh Chopra, Bangalore (IN); Asif Khan, Bangalore (IN); Navneet Upadhyay, Ghaziabad (IN); Pradeep Mittal, Karnal (IN)

(73) Assignee: EMC IP Holding Company, Hopkinton, MA (US)

( * ) Notice: Subject to any disclaimer, the term of this patent is extended or adjusted under 35 U.S.C. 154(b) by 210 days.

(21) Appl. No.: 16/022,585

(22) Filed: Jun. 28, 2018

(65) Prior Publication Data
US 2020/0004640 A1    Jan. 2, 2020

(51) Int. Cl.
*G06F 11/14* (2006.01)
*G06F 9/455* (2018.01)
*G06F 16/28* (2019.01)

(52) U.S. Cl.
CPC ...... *G06F 11/1461* (2013.01); *G06F 9/45558* (2013.01); *G06F 16/285* (2019.01);
(Continued)

(58) Field of Classification Search
CPC ............... G06F 11/1461; G06F 16/285; G06F 9/45558; G06F 2009/45583; G06F 2201/815
See application file for complete search history.

(56) References Cited

U.S. PATENT DOCUMENTS 9,424,056 B1 *   8/2016   Bachu ................. G06F 11/1446
9,977,704 B1     5/2018   Chopra et al.
(Continued)

OTHER PUBLICATIONS

Cui et al., "HotRestore: a fast restore system for virtual machine cluster," 28th Large Installation System Administration Conference (LISA14), 2014. (Year: 2014).*

*Primary Examiner* — Jay A Morrison
(74) *Attorney, Agent, or Firm* — Chamberlain, Hrdlicka, White, Williams & Aughtry

(57) ABSTRACT

A computing device for backing up virtual machine data includes a persistent storage and a backup initiator. The persistent storage stores virtual machine priority groupings and backup policies associated with the virtual machine priority groupings. The backup initiator obtains write rates of virtual machines; divides the virtual machines into priority groups based on the obtained write rates; updates the virtual machine priority groupings based on the priority groups; and performs a backup of the virtual machine data based on the backup policies using the updated virtual machine priority groupings.

19 Claims, 13 Drawing Sheets

(52) U.S. Cl.
CPC .............. *G06F 2009/45583* (2013.01); *G06F 2201/815* (2013.01)

(56) References Cited

U.S. PATENT DOCUMENTS

| | | | |
|---|---|---|---|
| 2006/0225065 A1* | 10/2006 | Chandhok | G06F 11/1458 717/168 |
| 2013/0185719 A1* | 7/2013 | Kar | G06F 9/45558 718/1 |
| 2015/0106334 A1* | 4/2015 | Lee | G06F 9/45558 707/639 |
| 2016/0147608 A1* | 5/2016 | Anglin | H04L 43/0888 711/162 |
| 2019/0324865 A1* | 10/2019 | Weissman | G06F 11/1461 |

\* cited by examiner

Example Virtual Machine Priority Groupings 500

Virtual Machine Grouping Entry A 510A

Virtual Machine Identifiers
- Virtual Machine Identifier A 512A
- ● ● ●
- Virtual Machine Identifier N 512N Relative Priority 514

● ● ●

Virtual Machine Grouping Entry N 510N

FIG. 5

Example Virtual Machine Priority Groupings 740

Virtual Machine Grouping A 742

| Virtual Machine E Identifier 742A | Virtual Machine Identifier F 742B |

Virtual Machine Grouping B 744

| Virtual Machine Identifier A 744A | Virtual Machine Identifier C 744B |

Virtual Machine Grouping C 746

| Virtual Machine Identifier B 746A | Virtual Machine Identifier D 746B |

FIG. 7C

SYSTEM AND METHOD FOR ADAPTIVE BACKUP WORKFLOWS IN DYNAMIC PRIORITY ENVIRONMENT

BACKGROUND

Computing devices may include any number of internal components such as processors, memory, and persistent storage. Each of the internal components of a computing device may be used to generate data. The generated data may be stored in an internal component of the computing device. The process of generating and storing data may utilize computing resources of the computing devices such as processing and storage.

SUMMARY

In one aspect, a computing device for backing up virtual machine data in accordance with one or more embodiments of the invention includes a persistent storage and a backup initiator. The persistent storage stores virtual machine priority groupings and backup policies associated with the virtual machine priority groupings. The backup initiator obtains write rates of virtual machines; divides the virtual machines into priority groups based on the obtained write rates; updates the virtual machine priority groupings based on the priority groups; and performs a backup of the virtual machine data based on the backup policies using the updated virtual machine priority groupings.

In one aspect, a method for backing up virtual machine data in accordance with one or more embodiments of the invention includes obtaining write rates of virtual machines hosting the virtual machine data; dividing the virtual machines into priority groups based on the obtained write rates; updating virtual machine priority groupings based on the priority groups; and storing a backup of the virtual machine data based on backup policies using the updated virtual machine priority groups. The backup policies specify an order in which portions of the virtual machine data are stored in a backup storage.

In one aspect, a non-transitory computer readable medium in accordance with one or more embodiments of the invention includes computer readable program code, which when executed by a computer processor enables the computer processor to perform a method for backing up virtual machine data, the method includes obtaining write rates of virtual machines hosting the virtual machine data; dividing the virtual machines into priority groups based on the obtained write rates; updating virtual machine priority groupings based on the priority groups; and storing a backup of the virtual machine data based on backup policies using the updated virtual machine priority groups. The backup policies specify an order in which portions of the virtual machine data are stored in a backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 5 shows a diagram of example virtual machine priority groupings in accordance with one or more embodiments of the invention.

FIG. 7C shows a diagram of example virtual machine priority groupings of the system of FIG. 7A.

DETAILED DESCRIPTION

Figure 1:
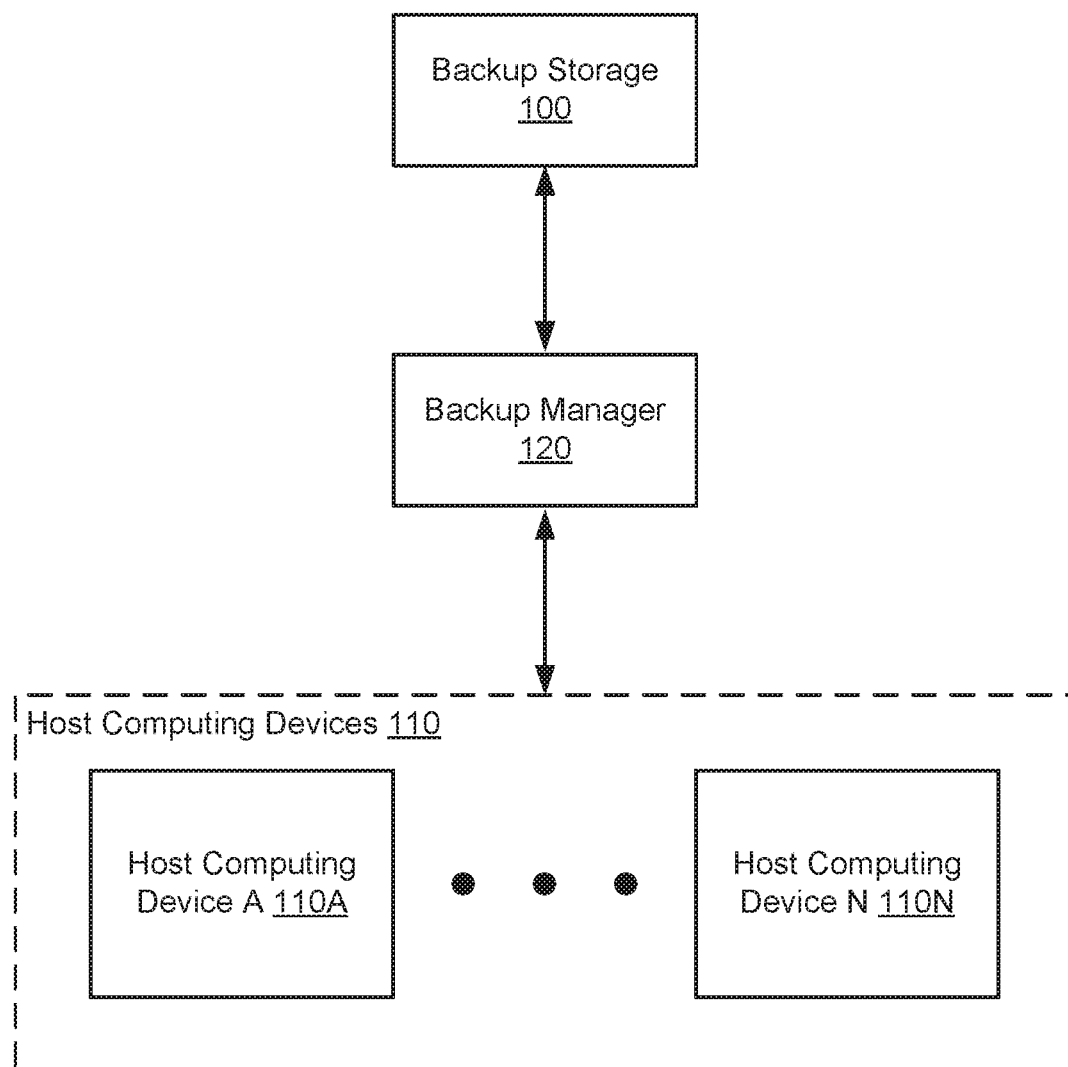
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for storing of client data in backup storages. The client data may be, for example, a backup of a virtual machine, or a portion thereof, hosted by a computing device. A backup of a virtual machine may include, for example, an image of the virtual machine, a difference disk of a virtual machine, or another data structure that may be used to recover a predetermined state of a virtual machine. The backup may include other types of data without departing from the invention. The client data may include data, other than a backup of a virtual machine, without departing from the invention.

In one or more embodiments of the invention, the system prioritizes the backup of some client data over other client data based on a significance of the prioritized client data to the operation of a distributed system. For example, in a distributed system, data stored in different computing devices may have different significance to the operation of the system. A computing device hosting a virtual machine that executes a high transaction rate database used by dozens of other computing devices may be much more significant to the operation of the distributed system than text documents served by a file server hosted by a second computing device.

In one or more embodiments of the invention, prioritizing storage of client data includes establishing an ordering or frequency of storage of various portions of client data. For example, a first portion of client data that is prioritized over a second portion of client data may be stored in a backup storage more frequently than the second portion of client data. In another example, the first portion of client data may be stored before the portion of client data when both portions are to be stored during the same time period.

In one or more embodiments of the invention, the system determines a relative significance of different portions of client data based on the relative write rate of each portion of the client data. In other words, client data that is changing frequently is considered to be more significant and, consequently, is prioritized for storage in a backup storage over client data that is changing infrequently. By doing so, embodiments of the invention may decrease the likelihood of losing client data. Similarly, low significance client data may be less frequently stored and, therefore, reduce the unnecessary expenditure of computing resources for storage of insignificant client data.

In one or more embodiments of the invention, the client data is a backup of any number of virtual machines hosted by computing devices of the system. For example, a system may include virtual machines that are backed up by storing images or other data in a backup storage. Embodiments of the invention may prioritize the generation and storage of each of the aforementioned backups in the backup storage so that high write rate virtual machines are prioritized for backup over low write rate virtual machines.

In one or more embodiments of the invention, the system provides a composite backup prioritization that considers both the significance of the client data based on write rates and other factors. For example, the system may identify whether any critical applications are hosted by computing devices. In such a scenario, the client data may be prioritized if it either (i) has a high write rate or (ii) is considered to be critical. Critical applications may be identified by analyzing the application executing on virtual machines and selecting any virtual machines that host predetermined applications as being critical. By doing so, a baseline of critical infrastructure, i.e., virtual machines, may be identified for high prioritization of storage in addition to infrastructure that is identified based on its write rates.

FIG. 1 shows a diagram of a system in accordance with one or more embodiments of the invention. The system may include a backup storage (100), a backup manager (120), and one or more host computing devices (110A, 110N). Data from the host computing devices (110A, 110N), e.g., client data, may be stored in the backup storage (100). The client data may be stored, for example, for redundancy purposes. The data may be stored for other reasons without departing from the invention. The backup manager (120) may orchestrate the process of storing and/or access client data in the backup storage (100). Each of the components of the system may be operably connected to each other using any combination and quantity of wired and/or wireless networks. Each component of the system is discussed below.

In one or more embodiments of the invention, the backup storage (100) stores client data and/or provides stored client data. The data may be, for example, backup data of one or more host computing devices (110A, 110N). The backup storage (100) may obtain the backup data from the backup manager (120) or from the host computing device (110).

In one or more embodiments of the invention, the backup storage (100) may store deduplicated data. Deduplication of data may be a process by which only unique portions of data are stored. For example, the backup storage (100) may compare portions of to-be-stored data to portions of already stored data. If the to-be-stored data matches any already stored data the to-be-stored data may be discarded rather than stored. Other more complicated methods of performing deduplication may be used without departing from the invention.

In one or more embodiments of the invention, performing deduplication of client data may consume computing resource. In other words, deduplication may be computationally expensive when compared to storing data without deduplication. For example, performing deduplication may consume more processing cycles, memory bandwidth, storage I/O cycles, etc. than the storage of client data without deduplication.

In one or more embodiments of the invention, the backup storage (100) is implemented as a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage (100) described throughout this application and/or all, or a portion thereof, of the methods illustrated in FIGS. 6A-6D. For additional details regarding computing devices, See FIG. 8.

In one or more embodiments of the invention, the backup storage (100) is implemented as a logical device. The logical device may utilize the computing resources of any number of computing devices and thereby provide the functionality of the backup storage (100) described throughout this application and/or all, or a portion thereof, of the methods illustrated in FIGS. 6A-6D.

In one or more embodiments of the invention, the host computing devices (110A, 110N) store client data in and/or retrieve stored client data from the backup storage (100). The stored client data may be, for example, a backup of the data stored in the host computing devices (110A, 110N).

In one or more embodiments of the invention, the host computing devices (110A, 110N) are implemented as computing devices. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the host computing devices (110A, 110N) described throughout this application. For additional details regarding computing devices, See FIG. 8.

In one or more embodiments of the invention, the host computing devices (110A, 110N) are implemented as logical devices. A logical device may utilize the computing resources of any number of computing devices and thereby provide the functionality of the host computing devices (100A, 110N). For additional details regarding the host computing devices (110A, 110N), See FIG. 3.

In one or more embodiments of the invention, the backup manager (120) orchestrates the storage of client data of the host computing devices (110A, 110N) in the backup storage (100). To orchestrate the storage of the client data, the backup manager (120) may prioritize the storage of the client data. In other words, the backup manager (120) may specify a frequency, ordering, or other characteristic of the orchestrated storage of client data in the backup storage (100). As discussed above, deduplicating client data may be computationally expensive and consume significant amounts of time. Due to computing resource limitations, it may only be possible to storage a finite amount of client data during any period of time. Thus, it may be important to carefully prioritize the storing of client data. Embodiments of the invention may provide a method of prioritizing storing of client that improves the reliability of the host computing devices (110), decreases the overconsumption of computing resources due to the unnecessary storage of client data, and/or other advantages.

In one or more embodiments of the invention, the backup manager (120) is implemented as a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup manager (120) described throughout this application and/or all, or a portion thereof, of the methods illustrated in FIGS. 6A-6D. For additional details regarding computing devices, See FIG. 8.

In one or more embodiments of the invention, the backup manager (120) is implemented as a logical device. The logical device may utilize the computing resources of any number of computing devices and thereby provide the functionality of the backup manager (120) described throughout this application and/or all, or a portion thereof, of the methods illustrated in FIGS. 6A-6D. For additional details regarding the backup manager (120), See FIG. 2.

While the system of FIG. 1 has been illustrated as including a limited number of components for the sake of brevity, the system may include additional components (not shown), fewer components, and/or different components (not shown) without departing from the invention. For example, the system may include multiple backup storages and/or multiple backup managers that each interact with different subsets of the host computing devices (110) or all of the host computing devices (110)

Figure 2:
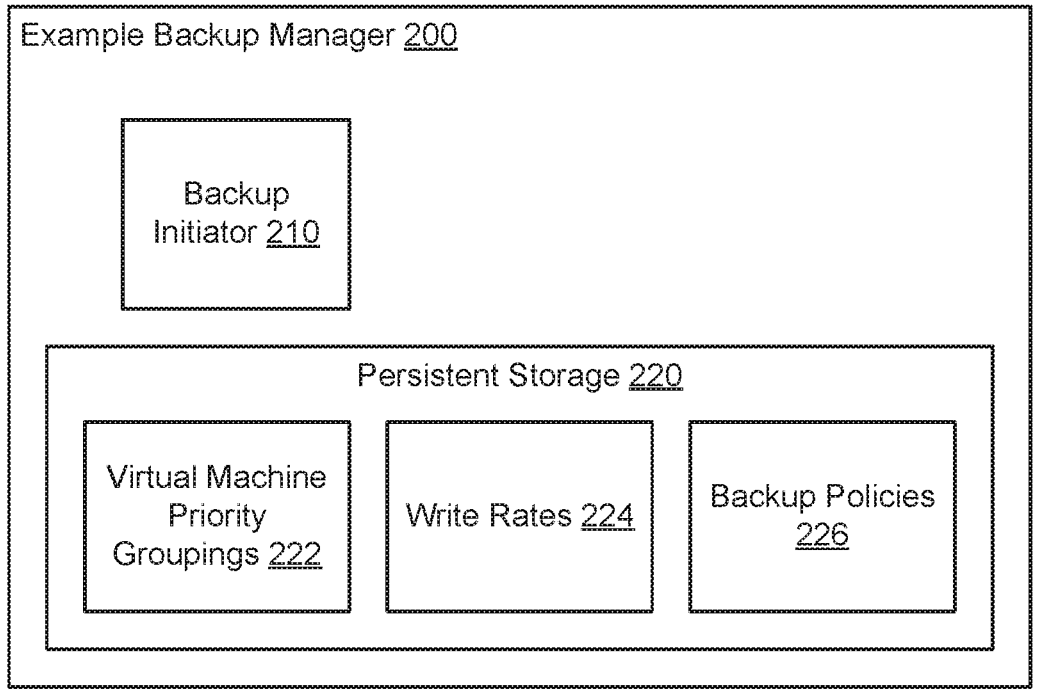
FIG. 2 shows a diagram of an example backup manager in accordance with one or more embodiments of the invention.

FIG. 2 shows a diagram of an example backup manager (200) in accordance with one or more embodiments of the invention. The example backup manager (200) may be the same as the backup manager (120, FIG. 1) discussed above. As discussed above, the example backup manager (200) may orchestrate the storage of client data in a backup storage. To provide the aforementioned functionality, the example backup manager (200) may include a backup initiator (210) and a persistent storage (220). The persistent storage (220) may store data structures utilized by the backup initiator (210). Each component of the example backup manager (200) is discussed below.

In one or more embodiments of the invention, the backup initiator (210) initiates storage of client data from host computing devices. The backup initiator (210) may initiate the storage of client data as specified by backup policies (226), stored in the persistent storage (220), which are discussed in greater detail below.

In one or more embodiments of the invention, the backup initiator (210) prioritizes the storage of client data, e.g., creates an priority ordering of the host computing devices. To generate the ordering, the backup initiator (210) may monitor the rates at which data is stored in the host computing devices and store the monitored rates as write rates (224) in the persistent storage (220). The backup initiator (210) may group virtual machines into priority groups (e.g., 222) using the write rates (224). The backup policies (226) may use the priority groupings as the basis for when client data is to be stored in a backup storage. Consequently, the ordering specified by the priority groupings may impact when client data is stored in backup storage.

In one or more embodiments of the invention, the backup initiator (210) may identify critical virtual machines. The backup initiator (210) may monitor the applications executing on virtual machines and identify each as critical if one or more predetermined applications are hosted by the virtual machines. Virtual machines not hosting one or more of the predetermined applications may not be identified as critical.

For example, consider a scenario in which a virtual machine hosts an email exchange or a transaction database which is considered to be one of the predetermined applications critical. The backup initiator (210) may identify the virtual machine as critical based on the presence of the executing program code. In one more embodiments of the invention, the list of predetermined applications may be set by a user.

In one or more embodiments of the invention, a list of virtual machine considered to be critical may be stored in memory (not shown) or in persistent storage (220). The list may be generated by the backup initiator (210) or another component without departing from the invention.

In one or more embodiments of the invention, the backup initiator (210) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup initiator (210) described throughout this application and/or all or a portion of the methods illustrated in FIGS. 6A-6D.

In one or more embodiments of the invention, the backup initiator (210) is implemented as computer instructions (e.g. computer code) stored on a persistent storage that when executed by a processor of the example backup manager (200) cause the example backup manager (200) to provide the functionality of the backup initiator (210) described throughout this application and/or all or a portion of the methods illustrated in FIGS. 6A-6D.

As discussed above, the backup initiator (210) may use data structures stored in the persistent storage (220). In one or more embodiments of the invention, the persistent storage (220) stores data structures and may be, for example, hard disk drives, solid state drives, tape drives, or any combination thereof. The persistent storage (220) may be other types of digital storage without departing from the invention. The persistent storage (220) may be a virtualized storage without departing from the invention.

The data structures stored by the persistent storage (220) may include virtual machine priority groupings (222), write rates (224), and backup policies (226). The persistent storage (220) may include additional, fewer, and/or different data structures without departing from the invention. Each of the aforementioned data structures is discussed below.

The virtual machine priority groupings (222) may be data structures that specify the relative priority of storing different portions of client data. For example, the virtual machine priority groupings (222) may specify that a first portion of client data is prioritized over the storage of a second portion of client data. The first portion of client data may be, for example, an image of a virtual machine hosted by a first host computing device while the second portion of client data may be, for example, an image of a second virtual machine hosted by a second host computing device.

In one or more embodiments of the invention, the priority groups specified in the virtual machine priority groupings (222) are updated by the backup initiator (210). The virtual machine priority groupings (222) may be updated using the write rates (224). For example, as write rates of different portions of client data change, the relative priority of the portion of the client data may change. The priority of a portion of client data may increase as its associated write rate increases and may decrease as its write rate decreases. For additional details regarding the virtual machine priority groupings (222), See FIG. 5.

The write rates (224) may be data structures that specify the rate at which different portions of client data are being written. For example, a first portion of client data may be a database and a second portion of client data may be a text document. Due to the high utilization of the database, the first portion of the client data may have a high write rate. In contrast, due to infrequent updates to the text document the second portion of the client data may have a low write rate.

In one or more embodiments of the invention, a write rate specifies a frequency in which machine portion of client data is modified and/or deleted. The write rates (224) may be used to determine the relative priority of the portions of the client data, e.g., a high write rate may mean high priority and a low write rate may mean low priority. The backup initiator (210) may use the write rates (224) to update the virtual machine priority groupings (222).

The backup policies (226) may be data structures that specify when client data is stored in backup storage. In one or more embodiments of the invention, the backup policies (226) are keyed to the virtual machine priority groupings (222). In other words, the backup policies (226) prioritize the storing of each portion of client data in the order specified by the virtual machine priority groupings (222).

In one or more embodiments of the invention, the backup policies (226) include a list of entries. Each entry specifies an identifier of a priority grouping specified by virtual machine priority groupings (222) and a workflow. The workflow may specify when and under what conditions the client data specified by a priority grouping specified by the identifier of the entry is to be stored in a backup storage. For example, the workflow may specify points in time when the client data is to be performed or a periodic rate at which the client data is to be stored. The workflow may specify when and under what conditions the client data is stored in the backup storage using other methods without departing from the invention.

Figure 3:
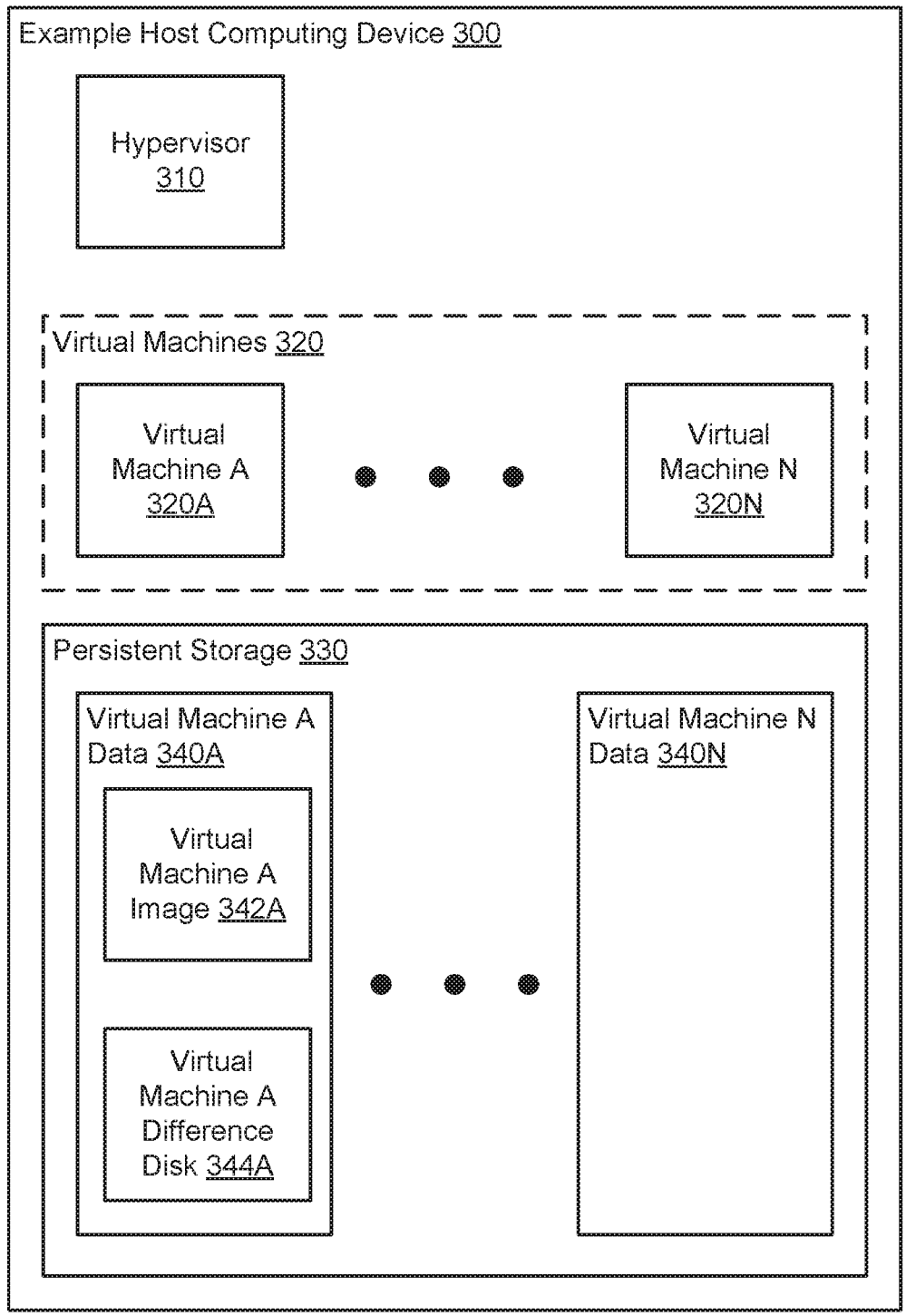
FIG. 3 shows a diagram of an example host computing device in accordance with one or more embodiments of the invention.

As discussed above, the backup manager may store client data from host computing devices. FIG. 3 shows a diagram of an example host computing device (300) in accordance with one or more embodiments of the invention. The example host computing device (300) may be similar to the host computing devices (110A, 110N) discussed above.

In one or more embodiments of the invention, the example host computing device (300) hosts virtual machines (320). The virtual machines (320) may be logical entities executing using computing resources of the example host computing device (300) and/or other computing devices. Each of the virtual machines (320A, 320N) may be performing similar or different processes. In one or more embodiments of the invention, the virtual machines (320) provide services to users (not shown). For example, the virtual machines (320) may host instances of databases, email servers, and/or other applications. The virtual machines (320) may host other types of applications without departing from the invention.

In one or more embodiments of the invention, the virtual machines (320A, 320N) are implemented as computer instructions, e.g., computer code, stored on a persistent storage that when executed by a processor of the example host computing device (300) cause the example host computing device (300) to provide the functionality of the virtual machines (320A, 320N) described throughout the application and/or all or a portion of the methods illustrated in FIGS. 6A-6D. For additional details regarding virtual machines, See FIG. 4.

In one or more embodiments of the invention, the example host computing device (300) includes a hypervisor (310) that orchestrates the operation of the virtual machines (320). The example host computing device (300) may orchestrate the operation of the virtual machines (320A, 320N) by allocating computing resources to each virtual machine. In one or more embodiments of the invention, the hypervisor (310) orchestrates the operation of the virtual machines (320) by storing backups of the virtual machines in a backup storage and/or performing restorations of the virtual machines using backups stored in the backup storage.

For example, the hypervisor (310) may initiate the generation of a backup of a virtual machine when prompted by a backup manager. Generating a backup may entail obtaining a copy of a virtual machine image (e.g., 342A) and/or a virtual machine difference disk(s) (e.g., 344A) and sending the obtained copy(s) to the backup manager and/or a backup storage. When a backup is generated, the virtual machine difference disk may be merged with the virtual machine image. As will be discussed in greater detail below, a virtual machine difference disk may represent the changes made to a virtual machine since a backup was last performed while the virtual machine image may represent the state of the virtual machine image at the time the backup was performed. Merging is discussed in greater detail below.

In one or more of embodiments of the invention, the hypervisor (310) is implemented as computer instructions, e.g., computer code, stored on a persistent storage that when executed by a processor of the example host computing device (300) cause the example host computing device (300) to provide the functionality of the hypervisor (310) described throughout the application and/or all or a portion of the methods illustrated in FIGS. 6A-6D. In one or more embodiments of the invention, the example host computing device (300) includes a persistent storage (330) that stores data structures. The data structures may include virtual machine data (340A, 340N) associated with a corresponding virtual machine (e.g., 320A, 320N). The persistent storage may include additional, fewer, and/or different data structures without departing from the invention.

In one or more embodiments of the invention, virtual machine data (340A, 340N) includes a virtual machine image (342A) and a virtual machine difference disk (344A). The virtual machine data may include any number of images and difference disks without departing from the invention.

In one or more embodiments of the invention, each virtual machine image (342A) includes data that represents the state of a virtual machine at a point in time. In other words, each virtual machine image (342A) may be a copy of the data of a corresponding virtual machine at a point in time.

In one or more embodiments of the invention, each virtual machine difference disk (344A) includes data that represents the changes made to a virtual machine over a period of time. For example, over time data of a virtual machine may change. The virtual machine difference disk (344A) may represent the incremental writes and erases during the period of time. Using a virtual machine image associated with a first point in time and a virtual machine difference disk associated with a period of time from the first point in time to a second point in time, a state of the virtual machine at the second point in time may be recovered by applying the changes specified by the virtual machine difference disk to the virtual machine image. The changes specified by multiple difference disks may be sequentially applied to a virtual machine image to obtain a latter state of the virtual machine. In one or more embodiments of the invention, applying the changes specified by a virtual machine difference disk to a virtual machine image is referred to as merging.

Figure 4:
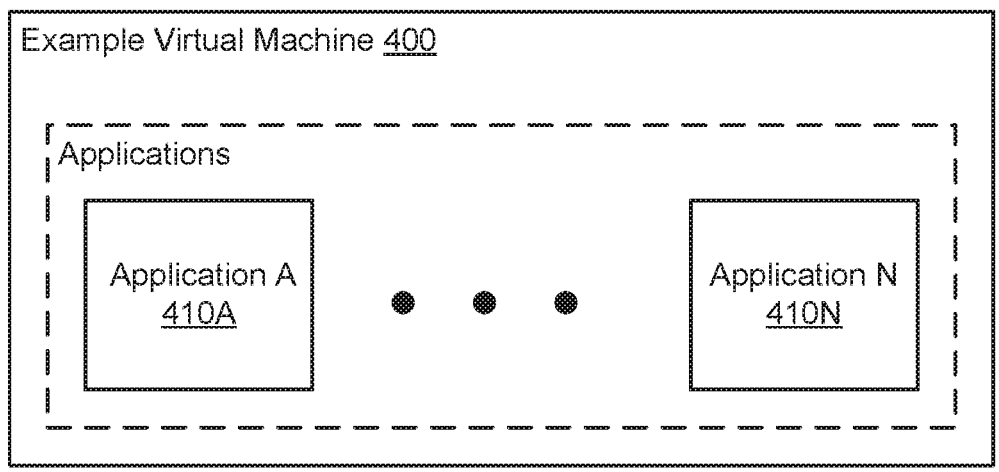
FIG. 4 shows a diagram of an example virtual machine in accordance with one or more embodiments of the invention.

FIG. 4 shows a diagram of an example virtual machine (400) in accordance with one or more embodiments of the invention. The example virtual machine (400) may be similar to one or more virtual machines (320A, 320N, FIG. 3) discussed above. The example virtual machine (400) may include one or more applications (410A, 410N).

In one or more embodiments of the invention, each application (410A, 410N) is an executing instance of program code. Each application (410A, 410N) may be executing instances of the same and/or different program code. In other words, the example virtual machine (400) may host any number of applications of any type without departing from the invention. As discussed above, data structures may be used by various component of the system illustrated in FIG. 1. FIG. 5 shows a diagram of example virtual machine priority groupings (500) in accordance with one or more embodiments of the invention. The example machine priority groupings (500) may be similar to the virtual machine priority groupings (222, FIG. 2) discussed above.

In one or more embodiments of the invention, the example virtual machine priority groupings (500) includes entries (510A, 510N). Each entry (510A, 510N) may include virtual machine identifiers (512A, 512N) and a relative priority (e.g., 514).

In one or more embodiments of the invention, the virtual machine identifiers (512A, 512N) correspond to respective virtual machines. Thus, the virtual machine identifiers (512A, 512N) may specify a group of virtual machines by including their identifiers.

In one or more embodiments of the invention, the relative priority (514) specifies the relative priority of a priority group when compared to other priority groups. A relative priority may be a ranking (i.e. highest priority, second highest priority, lowest priority, etc.).

While the example virtual machine priority groupings (500) are illustrated as a list of entries, the example virtual machine priority groupings (500) may have a different organizational structure, may include additional and/or different data, and may be broken down into any number of separate data structures each including a portion of the data of the example virtual machine priority groupings (500) without departing from the invention.

As discussed above, the backup manager (120, FIG. 1) and other components of FIG. 1 may perform methods for performing backups of virtual machine data.

Figure 6A:
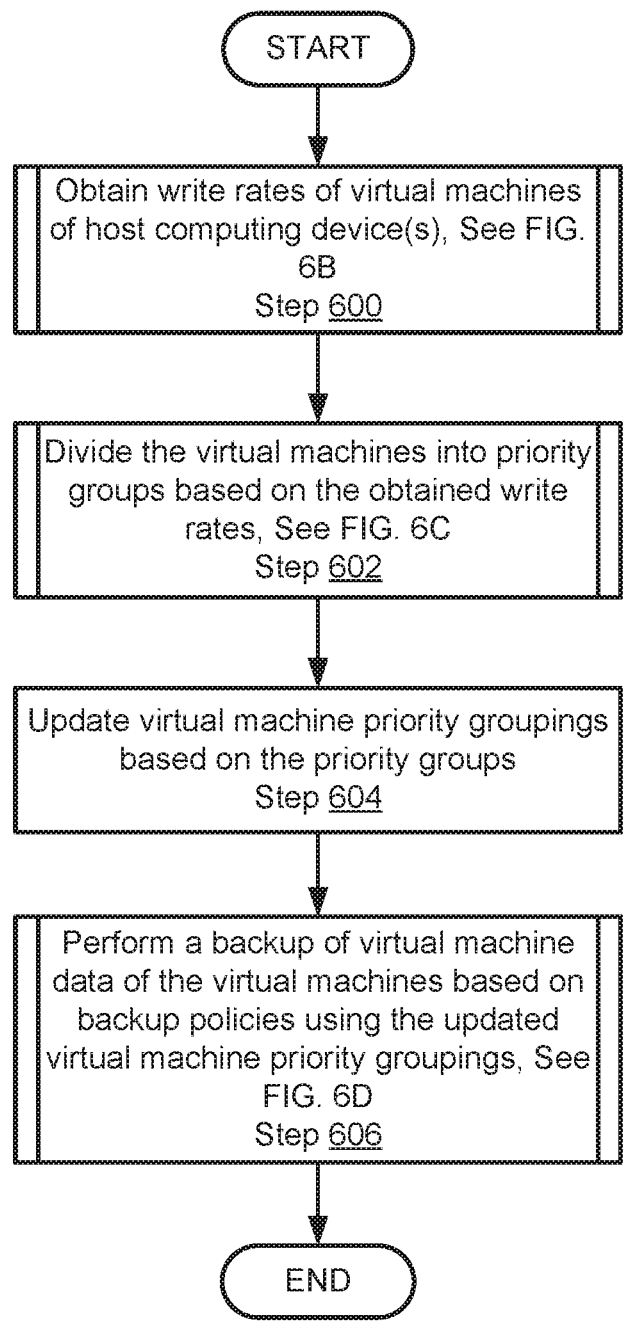
FIG. 6A shows a flowchart of a method of storing client data in accordance with one or more embodiments of the invention.

FIG. 6A shows a flowchart of a method in accordance with one or more embodiments of the invention. The method depicted in FIG. 6A may be used to store data from host computing devices in accordance with one or more embodiments of the invention. The method shown in FIG. 6A may be performed by, for example, a backup manager (e.g., 120, FIG. 1). Other components of the system illustrated in FIG. 1 may perform the method of FIG. 6A without departing from the invention.

In Step 600, write rates of virtual machines of host computing device(s) are obtained.

In one or more embodiments of the invention, a write rate specifies the frequency at which data is written by a virtual machine hosted by a host computing device. The obtained write rates may include any number of write rates for any number of corresponding virtual machines hosted by any number of host computing devices.

Figure 6B:
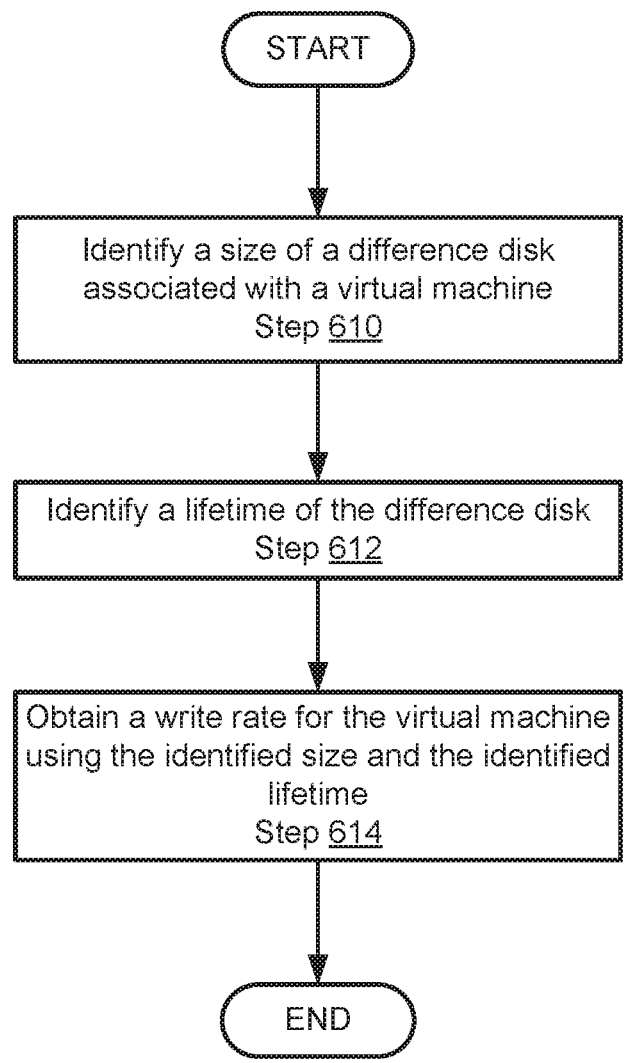
FIG. 6B shows a flowchart of a method of obtaining write rates in accordance with one or more embodiments of the invention.

In one or more embodiments of the invention, the write rates are obtained via the method illustrated in FIG. 6B. The write rates may be obtained via other methods without departing from the invention.

For example, in one or more embodiments of the invention, the write rates may be obtained from other entities that monitor storage input-output over time. The monitored storage input-output may be monitored at a granular level and thereby enable the write rates for each virtual machine to be obtained.

In Step 602, the virtual machines are divided into priority groups based on the obtained write rates.

In one or more embodiments of the invention, each priority group includes a non-overlapping portion of the virtual machines. In other words, all of the members of each priority group may not be members of other any other priority group. Each priority group may represent a relative importance of the virtual machines in the group when compared to the importance of virtual machines of other groups.

For example, a first priority group may include virtual machines hosting databases while a second priority group may include virtual machines hosting email databases. The first priority group may have a higher priority than the second priority group because the virtual machines of the first priority group have a write rate that is higher than the write rate of the virtual machines of the second priority group. The virtual machines may be divided into any number of priority groups using different criteria without departing from the invention.

Figure 6C:
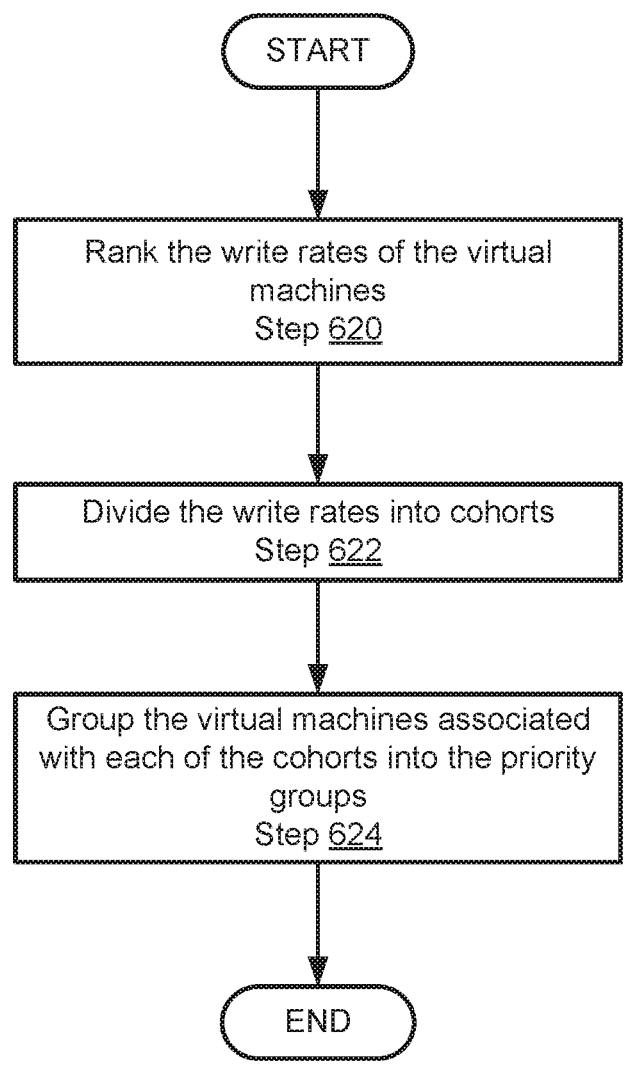
FIG. 6C shows a flowchart of a method of dividing virtual machines into priority groups in accordance with one or more embodiments of the invention.

In one or more embodiments of the invention, the virtual machines are divided via the method illustrated in FIG. 6C. The virtual machines may be divided via other methods without departing from the invention.

In Step 604, virtual machine priority groupings are updated based on the priority groups.

In one or more embodiments of the invention, the virtual machine priority groupings (e.g., 500, FIG. 5) are updated by populating entries of the virtual machine priority groupings with virtual machine identifiers. Each entry may correspond to a priority group. Each priority group may include a priority relative to other priority groups.

In Step 606, a backup of virtual machine data of the virtual machines is performed based on backup policies associated with the updated virtual machine priority groupings.

In one or more embodiments of the invention, performing the backup of the virtual machine data includes sending a copy of an image or a difference disk associated with a virtual machine to a backup storage. Any number of copies or images or difference disks associated with any number of virtual machines may be sent to a backup storage for storage as part of performing the backup without departing from the invention.

In one or more embodiments of the invention, a composite backup of virtual machine data may be performed. In a composite backup, both the prioritization and criticality of virtual machines is taken into account. For example, the policies that govern the backup may be triggered by both high priority virtual machines and critical virtual machines. Thus, both high priority and virtual machines that have been identified as critical may be backed up as part of the composite backup process. In contrast, virtual machines that are neither high priority nor have been identified as critical may be left for backup at a later point in time.

Figure 6D:
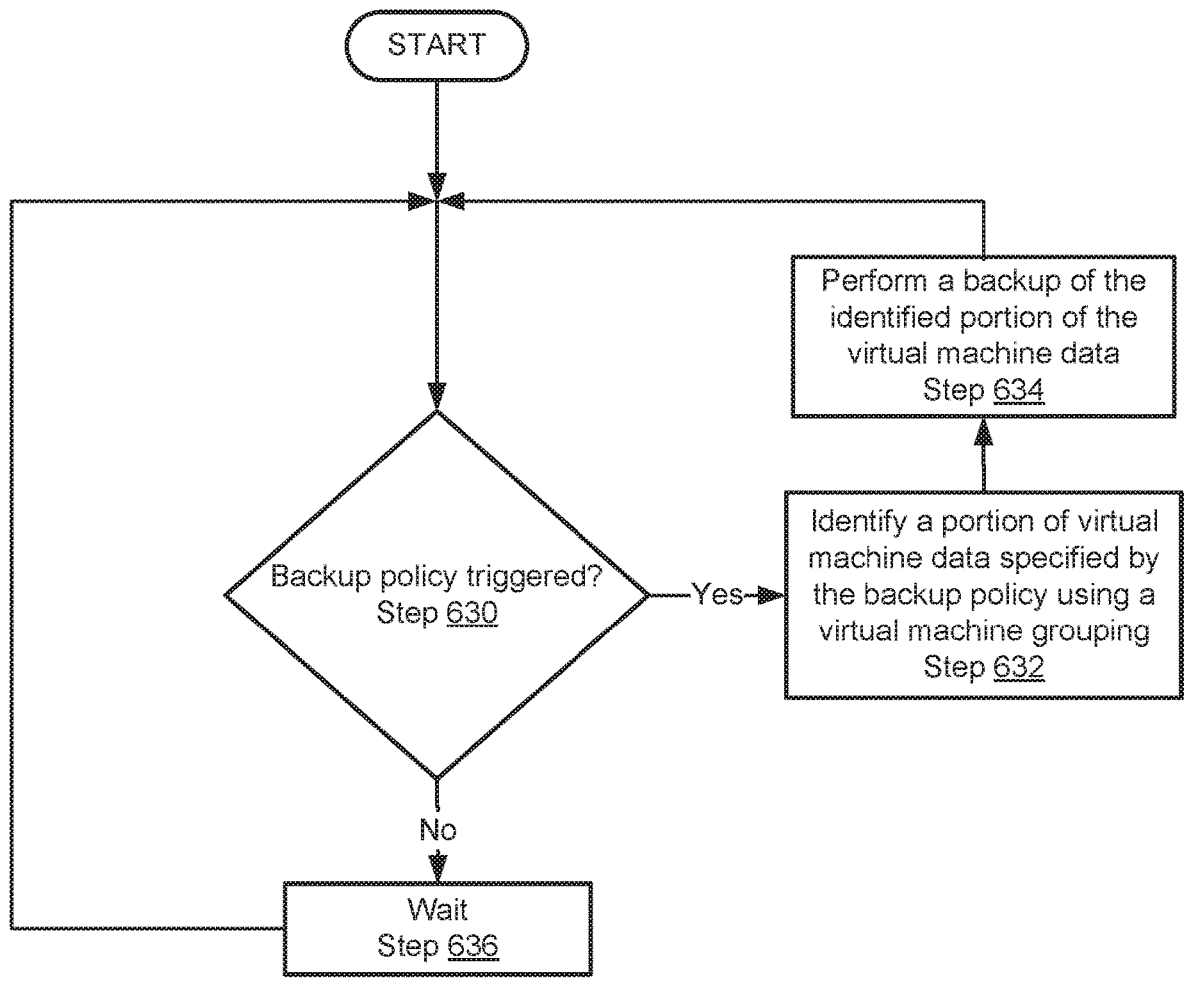
FIG. 6D shows a flowchart of a method of performing a backup of virtual machine data in accordance with one or more embodiments of the invention.

In one or more embodiments of the invention, the backup of the virtual machine data is performed via the method illustrated in FIG. 6D. The backup may be performed via other methods without departing from the invention.

As discussed above, a backup manager or other component of the system of FIG. 1 may perform methods for obtaining write rates of virtual machines.

FIG. 6B shows a method in accordance with one or more embodiments of the invention. The method used in FIG. 6B may be used to obtain a write rate for a virtual machine in accordance with one or more embodiments of the invention. The method used in FIG. 6B may be repeated for any number of virtual machines hosted by any number of host computing devices. The method shown in FIG. 6B may be performed by, for example, the backup manager (120, FIG. 1). Other components of the system illustrated in FIG. 1 may perform the method of FIG. 6B without departing from the invention.

In Step 610, a size of a difference disk associated with a virtual machine is identified.

As discussed above, a difference disk may represent the changes made to a virtual machine over a predetermined period of time. The difference disk may be stored on a persistent storage of a host computing device that hosts the virtual machine.

In Step 612, a lifetime of the difference disk is identified.

In one or more embodiments of the invention, the lifetime of the difference disk is the predetermined period of time over which the difference disk represents the changes made to a corresponding virtual machine. The difference disk may be stored in a storage that includes meta data including the creation date. The lifetime of the difference disk may be identified using the aforementioned meta-data. The lifetime of the difference disk may be identified using other methods without departing from the invention.

In Step 614, a write rate is obtained for the virtual machine using the identified size and the identified lifetime.

In one or more embodiments of the invention, the write rate is obtained by dividing the size of the difference disk by the lifetime of the difference disk. The write rate may be determined via other methods without departing from the invention.

For example, if the size of a difference disk is 24 megabytes, and the lifetime is 24 hours, then the write rate of the difference disk may be 1 megabyte per hour.

The method may end following Step 614.

As discussed above, the backup manager or other components of the system of FIG. 1 may perform methods for dividing virtual machines into priority groups.

FIG. 6C shows a flowchart of a method in accordance with one or more embodiments of the invention. The method depicted in FIG. 6C may be used to divide virtual machines into priority groups in accordance with one or more embodiments of the invention. The method shown in FIG. 6C may be performed by, for example, a backup manager (120, FIG. 1). Other components of the system shown in FIG. 1 may perform the method of FIG. 6C without departing from the invention.

In Step 620, the write rates of the virtual machines are ranked.

In one or more embodiments of the invention, the write rates are ranked from highest to lowest according to the magnitude of the write rates.

In Step 622, the write rates are divided into cohorts.

In one or more embodiments of the invention, the number of write rates in each cohort is similar to other cohorts. In other words, the write rates may be divided evenly so that there is approximately the same number of write rates in each cohort.

In one or more embodiments of the invention, the write rates are divided into a predetermined number of cohorts. The predetermined number may be, for example, ten. In such a scenario, each cohort may include a number of write rates specified by dividing the quantity of write rates by ten. The write rates may be divided into any number of cohorts without departing from the invention.

In one or more embodiments of the invention, the cohorts are divided so that write rates of a cohort are similar in magnitude. For example, write rates may be similar in size if there is a small difference in size between the write rates.

In one or more embodiments of the invention, the membership of the cohorts is determined by adding the lowest ranking write rate not yet added to a cohort to a cohort until the member of the cohort is completed. The process is repeated until all of the write rates are members of cohorts. Each cohort may then have ranking equal to the average of the rankings of the write rates that are members of the respective cohort.

In Step 624, the virtual machines associated with each of the cohorts are grouped into the priority groups.

In one or more embodiments of the invention, the virtual machines are grouped by populating the virtual machine priority groupings (e.g., 222, FIG. 2). The virtual machine priority groupings (e.g., 222, FIG. 2) may be populating by adding identifiers of each members of each cohort to a corresponding entry of the virtual machine priority groupings. The priority of each entry of the virtual machine priority groupings may be given the same priority of the cohort used to populate the respective entry.

The method may end following Step 624.

As discussed above, the backup manager (120, FIG. 1) or other components of the system of FIG. 1 may orchestrate storing client data in backup storage.

FIG. 6D shows a flowchart of a method in accordance with one or more embodiments of the invention. The method depicted in FIG. 6C may be used to orchestrate the storage of client data in accordance with one or more embodiments of the invention. The method shown in FIG. 6C may be performed by, for example, a backup manager (120, FIG. 1). Other components of the system illustrated in FIG. 1 may perform the method of FIG. 6C without departing from the invention.

In Step 630, it is determined if a backup policy is triggered. If the backup policy is triggered, the method may proceed to Step 632. If the backup policy is not triggered, the method may proceed to Step 636.

In one or more embodiments of the invention, a backup policy is triggered when a predetermined point in time is reached. In other words, backup policies may be triggered when predetermined points in time occur. For example, a backup policy may specify 1:00 AM every day. In such a scenario, the backup policy is triggered whenever the current time is 1:00 AM is reached.

In Step 632, a portion of virtual machine data specified by the backup policy that was triggered in Step 630 is identified using virtual machine priority groupings.

In one or more embodiments of the invention, the triggered backup policy includes an identifier of a priority group. The priority group may include identifiers of any number of virtual machines. The portion of the virtual machine data may include a backup of each virtual machine specified by the priority group.

In one or more embodiments of the invention, the triggered backup policy specifies an order in which the portion of virtual machine data is backed up. The portion of virtual machine data may require that a first sub-portion of portion of virtual machine data be backed up first before a second sub-portion of the portion of the virtual machine data is backed up.

In one or more embodiments of the invention, the backup policy may specify a rate at which the portion of virtual machine data is backed up. In other words, a frequency at which the portion of virtual machine data is stored in the backup storage.

In Step 634, a backup of the identified portion of the virtual machine data is performed.

In one or more embodiments of the invention, performing a backup of the identified portion of the virtual machine data includes sending either a virtual machine image or a difference disk for each virtual machine of the portion to a backup storage. Performing the backup of the identified portion of the virtual machine data may include merging the difference disk of each virtual machine of the portion with a corresponding virtual machine image. Doing so may update each virtual machine image to reflect a state of the virtual machine at the time of performing the backup.

The method may proceed to Step 630 following Step 634.

In Step 636, the method waits. The wait may be a predetermined period of time. The wait may be an interrupt, e.g., waits until a backup policy is triggered. The method may proceed to Step 630 following Step 636. In other words, the method shown in FIG. 6D may continue indefinitely into the future unless otherwise interrupted.

To further clarify aspect of embodiments of the invention, a non-limiting example is provided below.

Example 1

Figure 7A:
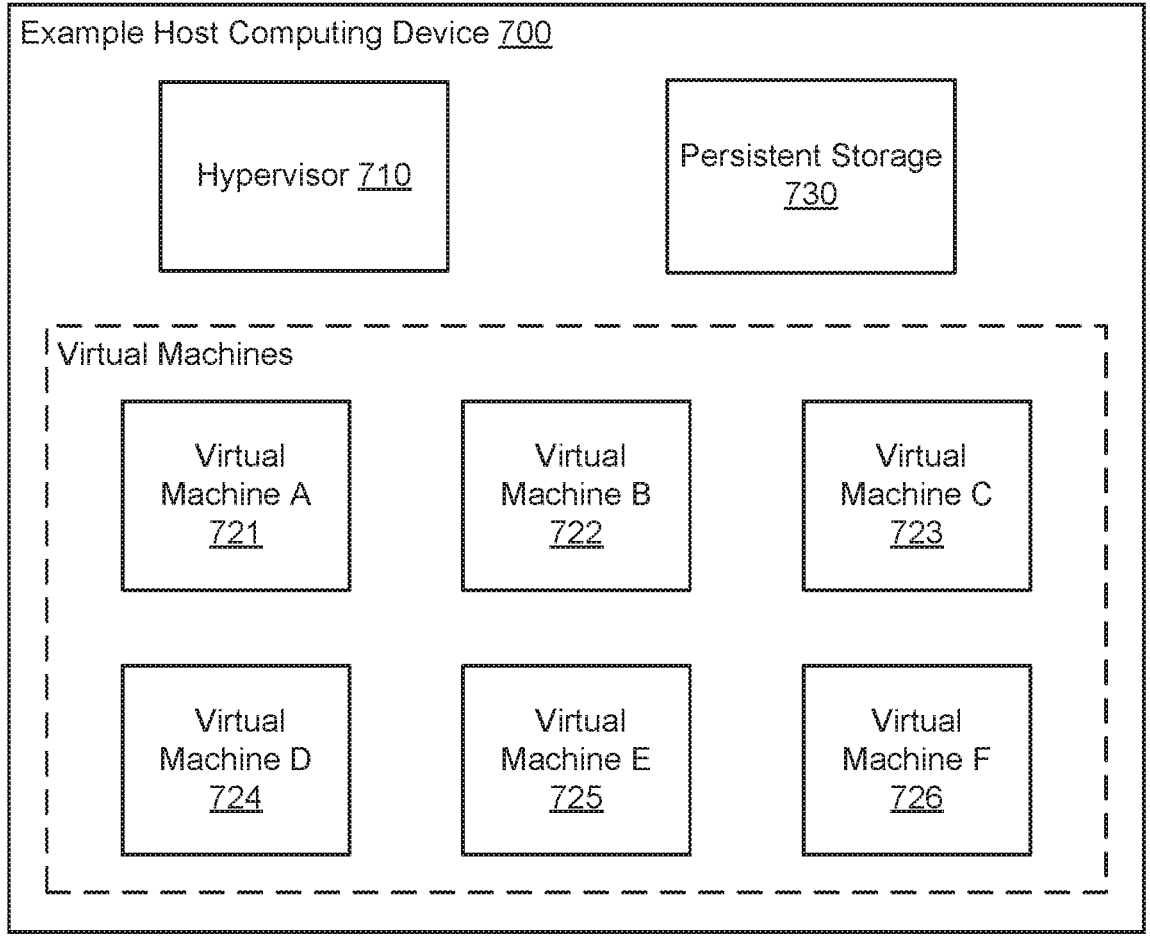
FIG. 7A shows a diagram of an example host computing device.

Consider a scenario in which virtual machine data is to be stored in a backup storage but, due to limited computing resources, must be prioritized. FIG. 7A shows a diagram of an example host computing device (700) in such a scenario. The example host computing device (700) may include a hypervisor (710) that orchestrates the operation of virtual machines A-F (721, 722, 723, 724, 725, 726) and a persistent storage (730) that stores virtual machine data of the virtual machines (721, 722, 723, 724, 725, 726).

Figure 7B:
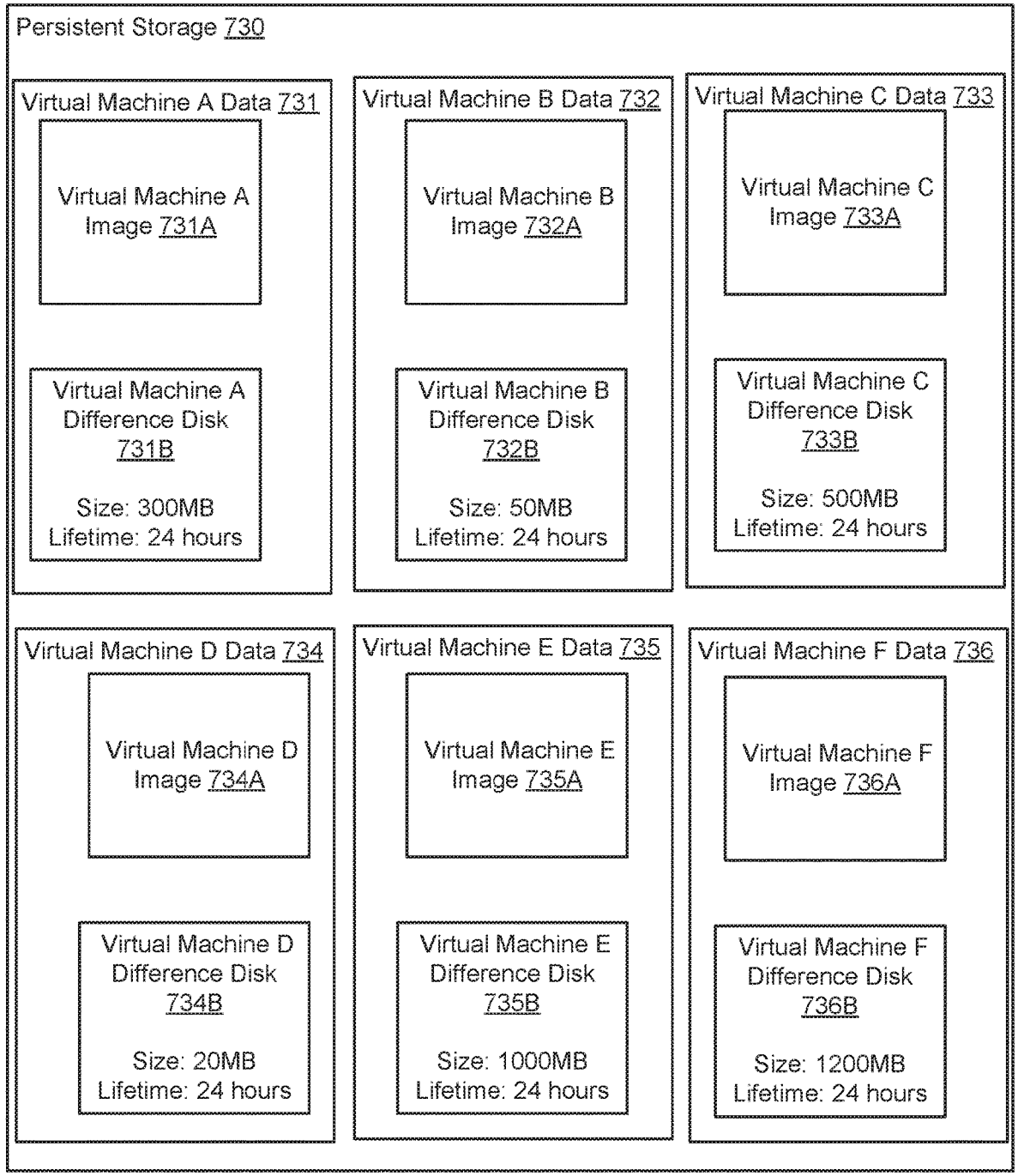
FIG. 7B shows a diagram of a persistent storage of the example host computing device of FIG. 7A.

FIG. 7B shows a diagram of the persistent storage (730) include virtual machine data (731, 732, 733, 734, 735, 736) that of respective virtual machines (721, 722, 723, 724, 725, 726, FIG. 7A). In other words, virtual machine data A (731) corresponds with virtual machine A (721); virtual machine data B (732) corresponds with virtual machine B (722), etc. The virtual machine data may include virtual machine images (731A, 732A, 733A, 734A, 735A, 736A) and virtual machine difference disks (731B, 732B, 733B, 734B, 735B, 736B).

Due to the differing applications hosted by the virtual machines, the virtual machines have different write rates. For example, virtual machine F (726) may host a high transaction rate database while virtual machine B (722) may host a file server for text documents which is infrequently used.

The write rate of each virtual machines is obtained by using the size and lifetime of the respective virtual machine difference disk (731B, 732B, 733B, 734B, 735B, 736B). For example, virtual machine difference disk A (731B) may have a size of 300 MB and a lifetime of 24 hours. Therefore, the write rate of virtual machine A (721, FIG. 7A) may be 12.5 MB per hour. Similarly, the write rate of virtual machine B may be calculated as approximately 2.1 MB per hour. Write rates are calculated for virtual machines C-F using this method.

The write rates may be ranked from highest to lowest according to the size of the write rate. The largest write rate have the highest rank. Using this process, the highest ranking write rate is difference disk F (736F) with a write rate of 50 MB per hour (1200 MB divided by 24 hours). The write rates ordered from highest ranking to lowest ranking are: virtual machine F, virtual machine E, virtual machine C, virtual machine A, virtual machine B, and virtual machine D.

The write rates may be divided into cohorts. The cohorts may be determined by the ranks of the write rates. The cohorts may have write rates that are similar. The write rate of virtual machine E (41.7 MB per hour) may be similar to the write rate of virtual machine F (50 MB per hour). Therefore, the write rates of virtual machine E and virtual machine F may be in a first cohort. Similarly, the write rates of virtual machine C and virtual machine A (20.8 MB per hour and 12.5 MB per hour, respectively) may be in a second cohort, and write rates of virtual machine B and virtual machine D (2.1 MB per hour and 0.8 MB per hour, respectively) may be in a third cohort.

The virtual machines corresponding to each cohort may be grouped using virtual machine identifiers. The virtual machines may be grouped by generating virtual machine priority groupings and populating each grouping with one or more identifiers each corresponding to a virtual machine. FIG. 7C shows a diagram of an example virtual machine priority groupings (740). Each virtual machine grouping (742, 744, 746) may include virtual machine identifiers (742A, 742B, 744A, 744B, 746A, 746B). Each virtual machine identifier (742A, 742B, 744A, 744B, 746A, 746B) may correspond to a respective virtual machine (721, 722, 723, 724, 725, 726, FIG. 7B).

The virtual machine groupings (742, 744, 746) may be associated to the cohorts of write rates. Virtual machine grouping A (742) may include virtual machines A and C identifiers (742A, 742B) corresponding to virtual machines of the first cohort. Similarly, virtual machine grouping B (744) may include virtual machines A and C identifiers (744A, 744B) corresponding to virtual machines of the second cohort. Virtual machine grouping C (746) may include virtual machine identifiers (746A, 746B) corresponding to virtual machines of the third cohort.

Virtual machine groupings (742, 744, 746) may be prioritized based on the ranking of the write rates associated with the virtual machine identifiers. Virtual machine grouping A (742) may be of highest priority because virtual machines E and F have write rates with the highest rankings. In contrast, virtual machine grouping C (746) may be of lowest priority because virtual machines B and D may have write rates with the lowest rankings. Virtual machine grouping B may have a priority between the priority of virtual machine grouping A (742) and virtual machine grouping C (746).

A backup policy may specify a frequency that portions of virtual machine data are backed up. The portions of virtual machine data may be specified by the virtual machine groupings (742, 744, 746). A first portion of virtual machine data may be obtained by grouping virtual machine data E (735, FIG. 7B) and virtual machine data F (726, FIG. 7A) since virtual machine data E and virtual machine data F each correspond to a virtual machine associated with virtual machine grouping A (742). Similarly, a second portion of virtual machine data may be obtained by grouping virtual machine data A and virtual machine data C, and a third portion of virtual machine data may be obtained by grouping virtual machine data B and virtual machine data D. Each portion of virtual machine data may have a frequency of backup. A backup of the first portion of virtual machine data may be backed up more frequently than the second or third portions because the first portion may be associated with virtual machine grouping A (742) which has the highest priority. In contrast, a backup of the third portion of virtual machine data may be backed up less frequently than the second or third portions because the third portion may be associated with virtual machine grouping C (746) which has the lowest priority.

End of Example 1

Figure 8:
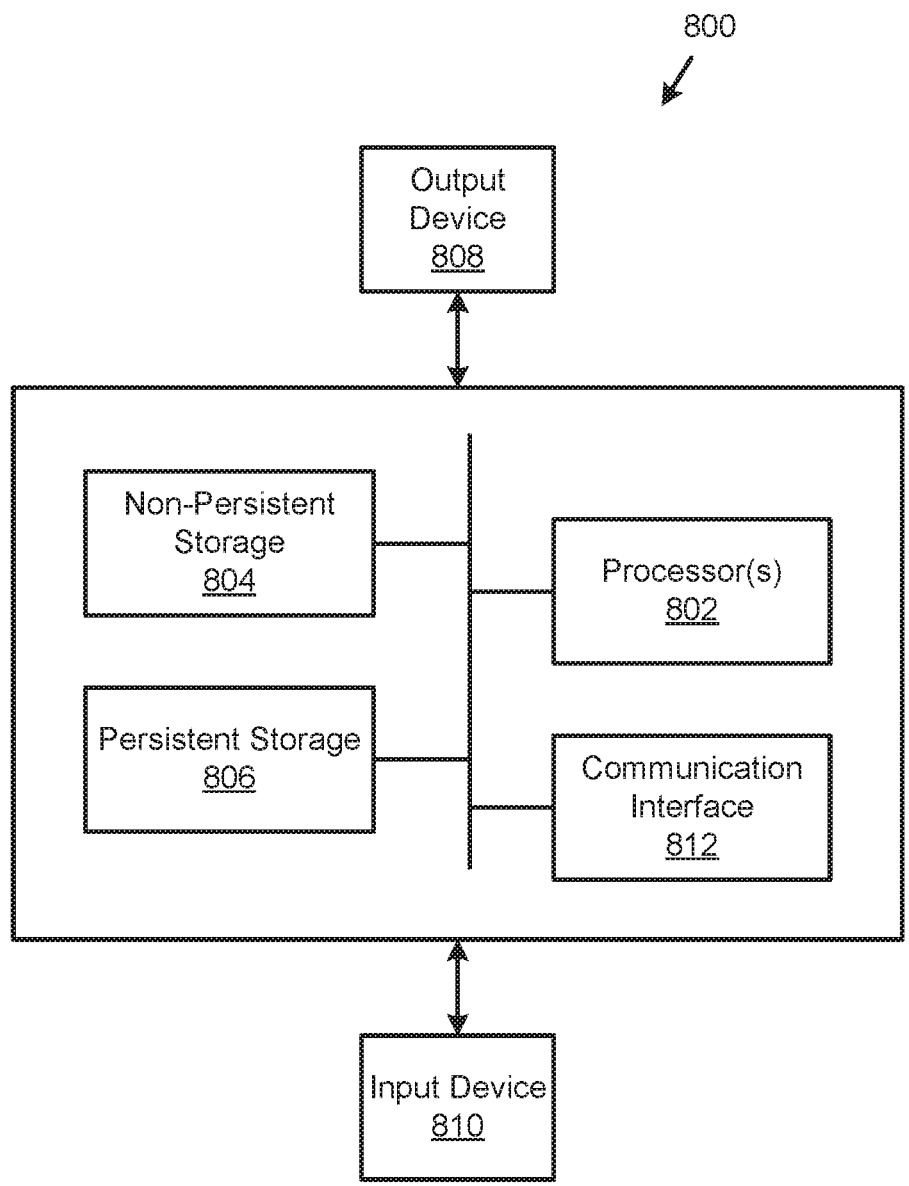
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) is an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) includes one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may improve the efficiency of storing data in a distributed system. More specifically, embodiments of the invention may prioritize the storage of data based on the likely significance of the impact of losing the data. For example, embodiments of the invention may provide a method of prioritizing the storage of backups of virtual machines based on the relative write rates of each of the virtual machines. Backups of high write rate virtual machines may be prioritized over low write rate virtual machines. By doing so, embodiments of the invention may provide a method of identifying virtual machines that have data that is of higher significant to the operation of the distributed system. Consequently, prioritizing the aforementioned backups of high write rate virtual machines may decrease the likelihood that significant data is lost due to a failure of a virtual machine.

Embodiments of the invention may improve the efficiency of storing data in a distributed system. More specifically, embodiments of the invention may decrease the frequency of storing of backups of low significance data. By doing so, needless consumption of computing resources directed toward the storage of low significance data can be conserved. By doing so, embodiments of the invention provide an improved computing device and distributed system that has more available computing resources, i.e., processor cycles, memory cycles, disk I/O, bandwidth, etc., when compared to a contemporary computing device. Thus, embodiments of the invention may address the problem of inefficient use of computing resources. This problem arises due to the technological nature of the environment in which data is backed up to backup storages in a distributed system.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device for backing up virtual machine data, comprising:
    a persistent storage storing:
        virtual machine priority groupings, and
        backup policies associated with the virtual machine priority groupings; and
    a backup initiator programmed to:
        obtain write rates of a plurality of virtual machines;
        divide the plurality of virtual machines into priority groups based on the obtained write rates;
        update the virtual machine priority groupings based on the priority groups; and
        perform a backup of the virtual machine data based on the backup policies using the updated virtual machine priority groupings,
    wherein obtaining write rates of the plurality of virtual machines comprises:
        identifying a size of a difference disk associated with a virtual machine of the plurality of virtual machines;
        identifying a lifetime of the difference disk; and
        obtaining a write rate for the virtual machine by dividing the identified size by the identified lifetime.

2. The computing device of claim 1, wherein dividing the plurality of virtual machines into priority groupings based on the obtained write rates comprises:
    ranking the write rates;
    dividing the write rates into cohorts; and
    grouping the virtual machines associated with each of the cohorts into the plurality of groups.

3. The computing device of claim 1, wherein performing the backup of the virtual machine data based on the backup policies comprises:
    selecting a first portion of the plurality of virtual machines specified by a first priority grouping of the virtual machine priority groupings;
    obtaining a first portion of the virtual machine data from the first portion of the plurality of virtual machines;
    storing the first portion of the virtual machine data in a backup storage;
    after storing the first portion of the virtual machine data:
        selecting a second portion of the plurality of virtual machines specified by a second priority grouping of the virtual machine priority groupings;
        obtaining a second portion of the virtual machine data from the second portion of the plurality of virtual machines; and
        storing the second portion of the virtual machine data in a backup storage,
    wherein the first priority grouping is of a higher priority than the second priority grouping.

4. The computing device of claim 1, wherein performing the backup of the virtual machine data based on the backup policies comprises:
    periodically backing up a first portion of the virtual machine data from a first portion of the plurality of virtual machines specified by a lowest priority grouping of the virtual machine priority groupings at a first rate; and
    periodically backing up a second portion of the virtual machine data from a second portion of the plurality of virtual machines specified by a second lowest priority grouping of the virtual machine priority groupings at a second rate,
    wherein the first rate is less than the second rate.

5. The computing device of claim 1, wherein the backup policies specify rates at which portions of the virtual machine data specified by the virtual machine priority groupings are backed up, wherein the backup policies specify different rates for different portions of the virtual machine data.

6. The computing device of claim 5, wherein the rates are a frequency at which the portions of the virtual machine data are backed up.

7. The computing device of claim 1, wherein the virtual machine priority groupings specify an order in which portions of the virtual machine data are backed up.

8. The computing device of claim 7, wherein each of the portions are sequentially backed up.

9. The computing device of claim 1, wherein the backup policies specify storage locations for portions of the virtual machine data.

10. The computing device of claim 9, wherein the storage locations are backup storages providing different qualities of storage service.

11. The computing device of claim 10, wherein the backup policies specify that portions of the virtual machine data specified by higher priority groupings of the virtual machine priority groupings are stored at locations providing a high quality of storage service.

12. The computing device of claim 11, wherein the backup policies specify that portions of the virtual machine data specified by lower priority groupings of the virtual machine priority groupings are stored at locations providing a low quality of storage service.

13. The computing device of claim 1, wherein updating the virtual machine priority groupings is performed when a backup policy of the backup policies triggers performance of a backup of a portion of the virtual machine data.

14. The computing device of claim 1, wherein performing the backup of the virtual machine data based on the backup policies comprises:
    making a determination that a backup policy of the backup policies has triggered a backup of a portion of the virtual machine data; and
    in response to the identification, storing the portion of the virtual machine data in a backup storage.

15. The computing device of claim 14, wherein the backup storage is a local storage.

16. The computing device of claim 14, wherein the backup storage is a remote storage.

17. A method for backing up virtual machine data, comprising:
    obtaining write rates of a plurality of virtual machines hosting the virtual machine data;
    dividing the plurality of virtual machines into priority groups based on the obtained write rates;
    updating virtual machine priority groupings based on the priority groups; and storing a backup of the virtual machine data based on backup policies using the updated virtual machine priority groups,
  wherein the backup policies specify an order in which portions of the virtual machine data are stored in a backup storage,
  wherein obtaining write rates of the plurality of virtual machines comprises:
    identifying a size of a difference disk associated with a virtual machine of the plurality of virtual machines;
    identifying a lifetime of the difference disk; and
    obtaining a write rate for the virtual machine by dividing the identified size by the identified lifetime.

18. The method of claim 17, wherein updating the virtual machine priority groupings is performed when a backup policy of the backup policies triggers performance of a backup of a portion of the virtual machine data.

19. A non-transitory computer readable medium comprising computer readable program code, which when executed by a computer processor enables the computer processor to perform a method for backing up virtual machine data, the method comprising:

obtaining write rates of a plurality of virtual machines hosting the virtual machine data;

dividing the plurality of virtual machines into priority groups based on the obtained write rates;

updating virtual machine priority groupings based on the priority groups; and storing a backup of the virtual machine data based on backup policies, wherein the backup policies specify an order in which portions of the virtual machine data are stored in a backup storage, wherein obtaining write rates of the plurality of virtual machines comprises:
  identifying a size of a difference disk associated with a virtual machine of the plurality of virtual machines;
  identifying a lifetime of the difference disk; and
  obtaining a write rate for the virtual machine by dividing the identified size by the identified lifetime.

* * * * *